L. W. STRYCKER.
WORK HOLDING TOOL.
APPLICATION FILED JUNE 18, 1912.
1,133,334.  Patented Mar. 30, 1915.
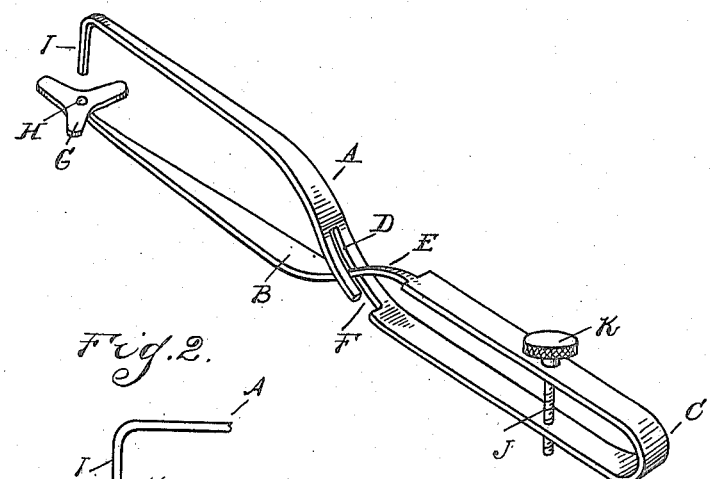
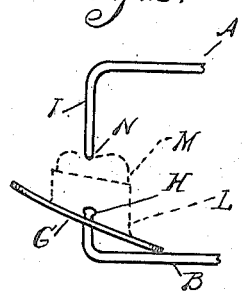
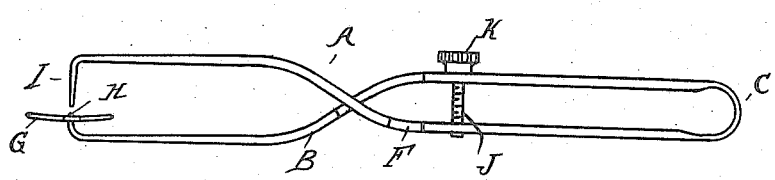
Inventor
Loraine W. Strycker
By Whittemore Hulbert & Whittemore
Attys.

UNITED STATES PATENT OFFICE.

LORAINE W. STRYCKER, OF NEW YORK, N. Y., ASSIGNOR TO DETROIT DENTAL MANUFACTURING COMPANY, OF DETROIT, MICHIGAN, A CORPORATION OF MICHIGAN.

WORK-HOLDING TOOL.

1,133,334.  Specification of Letters Patent.  Patented Mar. 30, 1915.

Application filed June 18, 1912. Serial No. 704,334.

*To all whom it may concern:*

Be it known that I, LORAINE W. STRYCKER, a citizen of the United States of America, residing at New York, in the county of New York and State of New York, have invented certain new and useful Improvements in Work-Holding Tools, of which the following is a specification, reference being had therein to the accompanying drawings.

The invention relates to work-holding tools, more particularly designed for use in dentistry, in the soldering of crowns and for similar operations. In the performance of such work it frequently happens that the body to be brazed or soldered is of irregular shape, and it is a difficult matter to hold the members which are to be attached in proper relation during the fusing of the solder. Furthermore, when subjected to a soldering heat, the members are easily distorted and it is therefore essential to avoid any pressure that might destroy the shape. To overcome these difficulties, I have devised a construction of holder, which is adapted to receive and hold the work without regard to the regularity or irregularity of the form; and further, to retain the parts in proper relative position without placing any objectionable pressure thereon.

In the drawings: Figure 1 is a perspective view of the holder. Fig. 2 is an elevation of the clamping jaws thereof, showing the manner of engaging the work; and Fig. 3 is a side elevation of the holder.

In general construction my improved holder is in the form of a pair of tongs, one tong having a work-support, and the other a pointed finger for bearing centrally upon the opposite side of the work. These tongs are preferably formed of a strip of metal bent to form the cross arms A and B and the resilient bend C. The cross arms are guided in relation to each other, preferably by cutting a slot D in one member for engaging a narrow section E of the other member, the parts being first engaged through an entrance slot F. One of the tongs such as B is provided with a holder G, which, as shown, is three-pronged, and is attached to the tong by a universal pivot H. This permits the member G to rock in any direction and to assume a position in conformity with the surface of the work bearing thereagainst. The other tong A is provided with a point I, which is directed toward the center of the holder G, and will bear centrally upon the work on the opposite side from the member G. The tension of the resilient bend C is preferably such as to normally draw the finger I and holder G together; but movement in this direction is limited by a stop-screw J, which passes through an aperture in the arm B in rear of the cross bend therein, and has a threaded engagement with the opposite portion of the arm A. The screw has a milled head K, by which it can be conveniently adjusted to vary the limit of movement.

In the use of the instrument, an article—such as the dental crown band L, to which the cusp M is to be attached—is placed upon the holder G, and the finger I is engaged with the recess in the cusp, as indicated at N. The stop-screw K is then adjusted so as to limit the movement of the finger I and to relieve the work from pressure. The soldering is then performed by a blow-pipe or other heating means, and the work is thereby heated until the solder is fused. By reason of the fact that the inward movement of the finger I is limited by the stop K, there will be no pressure exerted upon the work when the metal is in a plastic condition. As the finger I and holder G are subjected to a strong oxidizing influence and a high degree of heat, I preferably form these parts of some high-fusing and non-oxidizing material, such as a nickel chromium alloy.

What I claim as my invention is:

1. A work-holder comprising a pair of tongs, a work-seat having a limited universal movement upon one of said tongs and a pointed finger upon the other tong, said finger being substantially opposite the point of connection between said work-seat and tongue.

2. A work-holder comprising a pair of tongs, a work-seat upon one tong having universal movement relative thereto, a finger upon the opposite tong, resilient means for normally pressing said finger toward said seat, and adjustable means for limiting the movement of said finger toward said seat, said adjustable means acting against the pressure of said resilient means.

3. A work-holder comprising a pair of tongs formed of a metallic strip having integral cross portions, one of said cross portions having intersecting longitudinal and transverse slots therein, the other cross portion being reduced in width to engage said longitudinal slot, a work-seat at the free end of one tong, and a finger upon the opposite tong.

4. A work-holder comprising a pair of tongs formed of a single cross bent metallic strip, one of the crossing portions being longitudinally slotted and the other crossing portion being reduced in width to engage said slot, a finger at the free end of one tong, a pivoted work-seat at the free end of the other tong, and resilient means for normally pressing said finger toward said work-seat.

In testimony whereof I affix my signature in presence of two witnesses.

LORAINE W. STRYCKER.

Witnesses:
 CECIL M. SLOANE,
 WILLIAM J. SCHNEIDER.